US010712945B2

(12) United States Patent
Wu et al.

(10) Patent No.: US 10,712,945 B2
(45) Date of Patent: Jul. 14, 2020

(54) DEDUPLICATION PROCESSING METHOD, AND STORAGE DEVICE

(71) Applicant: TENCENT TECHNOLOGY (SHENZHEN) COMPANY LIMITED, Shenzhen, Guangdong (CN)

(72) Inventors: Chentao Wu, Shenzhen (CN); Xiaosong Huang, Shenzhen (CN); Lei Xiao, Shenzhen (CN); Wei Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 219 days.

(21) Appl. No.: 16/030,244

(22) Filed: Jul. 9, 2018

(65) Prior Publication Data

US 2018/0314435 A1 Nov. 1, 2018

Related U.S. Application Data

(63) Continuation of application No. PCT/CN2017/105645, filed on Oct. 11, 2017.

(30) Foreign Application Priority Data

Oct. 14, 2016 (CN) .......................... 2016 1 0898862

(51) Int. Cl.
*G06F 3/06* (2006.01)
*G06F 12/10* (2016.01)
*G06F 16/174* (2019.01)

(52) U.S. Cl.
CPC .......... *G06F 3/0608* (2013.01); *G06F 3/0641* (2013.01); *G06F 3/0652* (2013.01);
(Continued)

(58) Field of Classification Search
None
See application file for complete search history.

(56) References Cited

FOREIGN PATENT DOCUMENTS

| CN | 101630290 A | 1/2010 |
| CN | 102033924 A | 4/2011 |

(Continued)

OTHER PUBLICATIONS

International Search Report for PCT/CN2017/105645 dated, Dec. 22, 2017 (PCT/ISA/210).
(Continued)

*Primary Examiner* — Charles Rones
*Assistant Examiner* — Han V Doan
(74) *Attorney, Agent, or Firm* — Sughrue Mion. PLLC

(57) ABSTRACT

A deduplication processing method is provided. A storage device includes a plurality of memories and each memory includes at least one physical block. Parameter information of an initial memory representing any one of the plurality of memories in the storage device is obtained. The parameter information includes at least one of a weight of the at least one physical block in the initial memory or a space usage of the initial memory, and the weight of the at least one physical block corresponding to a next write time point of the at least one physical block. A deduplication weight of the initial memory according to the parameter information of the initial memory is obtained. A target memory having a largest deduplication weight from initial memories is selected and deduplication processing on the at least one physical block of the target memory is performed.

20 Claims, 9 Drawing Sheets

(52) U.S. Cl.
CPC .......... *G06F 3/0673* (2013.01); *G06F 12/10* (2013.01); *G06F 16/1752* (2019.01); *G06F 2212/1044* (2013.01)

(56) References Cited

FOREIGN PATENT DOCUMENTS

| | | |
|---|---|---|
| CN | 105488095 A | 4/2016 |
| WO | 2015/096847 A1 | 7/2015 |

OTHER PUBLICATIONS

Communication dated May 8, 2019 from the China National Intellectual Property of Administration in counterpart Application No. 201610898862.X.

DEDUPLICATION PROCESSING METHOD, AND STORAGE DEVICE

CROSS-REFERENCE TO RELATED APPLICATIONS

This application is a continuation of International Application No. PCT/CN2017/105645, filed on Oct. 12, 2017, in the Chinese Patent Office, which claims priority from China Patent Application No. 201610898862.X, filed on Oct. 14, 2016, in the Chinese Patent Office, and entitled "DEDUPLICATION PROCESSING METHOD AND STORAGE DEVICE", the disclosure of which are incorporated herein by reference in their entireties.

BACKGROUND

1. Field

Apparatuses and methods consistent with exemplary embodiments relate to the field of storage technologies, and in particular, to deduplication processing.

2. Description of the Related Art

Deduplication processing is a processing manner of deleting duplicated data in a storage device. By means of deduplication processing, space of the storage device can be saved, and resource waste can be avoided. The storage device includes a plurality of memories, each memory includes at least one physical block, and data in the memory is actually stored in a form of a physical block. Therefore, performing deduplication processing on the duplicated data in the storage device is actually performing deduplication processing on the physical blocks in the plurality of memories.

Conventionally, a deduplication processing process may include the following operations: a processor polls the plurality of memories; for each polled memory, all physical blocks in the memory are transported to the processor; a plurality of sample physical blocks are randomly selected from these physical blocks, deduplication processing is performed on the plurality of sample physical blocks, a deduplication probability of the plurality of sample physical blocks is calculated according to a deduplication processing result, and the deduplication probability is used as a deduplication weight of the memory. According to the foregoing polling process, the processor may obtain a deduplication weight of each memory in the plurality of memories, so as to select a memory with the largest deduplication weight from the plurality of memories, and deduplication processing is performed on a physical block in the memory with the largest deduplication weight; after deduplication processing is completed, a next memory with the largest deduplication weight is selected, and deduplication processing is performed on a physical block in the next memory with the largest deduplication weight. The rest can be deduced by analogy. However, because a memory on which deduplication processing needs to be performed can be selected after the polling process of performing deduplication processing on a plurality of sample physical blocks in each memory, a process of selecting a memory on which deduplication processing needs to be performed is very complex and costs an excessively long time, and consequently, efficiency of deduplication processing is very low.

SUMMARY

One or more exemplary embodiments provide a deduplication processing method and a storage device, to simplify a process of selecting a memory on which deduplication processing is to be performed, reduce a time consumed by deduplication processing, and improve efficiency of deduplication processing.

According to an aspect of an exemplary embodiment, a deduplication processing method is provided, applied to a storage device, the storage device including a plurality of memories, each memory including at least one physical block, any of the plurality of memories being represented by using an initial memory. Parameter information of an initial memory representing any one of the plurality of memories in the storage device is obtained. The parameter information includes at least one of a weight of the at least one physical block in the initial memory or a space usage of the initial memory, and the weight of the at least one physical block corresponding to a next write time point of the at least one physical block. A deduplication weight of the initial memory according to the parameter information of the initial memory is obtained. A target memory having a largest deduplication weight from initial memories is selected and deduplication processing on the at least one physical block of the target memory is performed.

An initial memory in a storage device obtains parameter information of the initial memory and sends the parameter information of the initial memory to a processor, so that the processor calculates a deduplication weight of the initial memory according to the received parameter information of the initial memory, and selects a memory with the largest initial memory from the initial memories as a target memory, to perform deduplication processing on the target memory. In this way, a sample physical block does not need to be selected in a process of selecting the target memory, and deduplication processing does not need to be performed on the sample physical block to obtain a memory on which deduplication processing needs to be performed, to simplify a process of selecting the memory on which deduplication processing needs to be performed, save a selection time, and improve efficiency of deduplication processing.

In an exemplary embodiment, the obtaining parameter information of the initial memory includes:

obtaining a first time difference of each physical block in each memory in the initial memories, the first time difference being a time difference that is between adjacent write time points of the physical block and that is estimated according to historical write time points;

when a write request for the physical block is detected, calculating a time difference between a first write time point at which the write request is detected and a previous write time point of the physical block and using the time difference as a corrected time difference;

calculating an average value of the first time difference and the corrected time difference and using the average value as a second time difference; and calculating a sum of the first write time point and the second time difference, to obtain a second write time point, and obtaining a weight of the physical block according to the second write time point.

According to this manner, the parameter information of the initial memory is obtained, so that a weight of the physical block can be obtained and used as the parameter information of the initial memory, so as to calculate the deduplication weight of the initial memory according to the weight of the physical block, to avoid performing deduplication processing on the physical block on which frequent writing is performed.

In an exemplary embodiment, the method further includes:

obtaining a weight and a physical address of each physical block in the initial memory, forming a first-level queue entry, and adding the first-level queue entry to a first-level queue of the initial memory; and arranging the first-level queue entries in the first-level queue according to the weights, the first-level queue entries corresponding to the physical blocks in the initial memory, correspondingly, the parameter information of the initial memory including the first-level queue.

According to the foregoing first-level queue maintenance process, the physical block on which deduplication processing needs to be performed may be scheduled according to the first-level queue in a deduplication processing process of the memory, to ensure that deduplication processing is preferentially performed on a physical block with a large weight, to perform deduplication processing in order.

In an exemplary embodiment, the selecting a memory with the largest deduplication weight from at least one memory includes:

obtaining the deduplication weight and the first-level queue of each initial memory, forming a second-level queue entry, and adding the second-level queue entry to a second-level queue;

arranging the second-level queue entries corresponding to the initial memories according to the deduplication weights; and extracting a second-level queue entry with the largest deduplication weight from the second-level queue, and determining a memory corresponding to the second-level queue entry with the largest deduplication weight as the target memory.

According to the foregoing second-level queue maintenance process, the memory on which deduplication processing needs to be performed may be scheduled according to the second-level queue in a deduplication processing process of the memory, to ensure that deduplication processing is preferentially performed on a physical block with a large deduplication weight, to perform deduplication processing on the initial memories in order.

In an exemplary embodiment, the first-level queue of the initial memory includes at least one first-level queue entry, and each first-level queue entry includes a physical address of a physical block, and the obtaining the deduplication weight and the first-level queue of the initial memory and forming a second-level queue entry includes:

replacing a physical address of each first-level queue entry in the first-level queue with a corresponding logic address according to an address mapping table, to obtain a mapped first-level queue entry, and forming a mapped first-level queue by using the mapped first-level queue entry, the address mapping table including a mapping relationship between the physical address and the logic address; and obtaining the deduplication weight and the mapped first-level queue of the initial memory, and forming the second-level queue entry.

In an exemplary embodiment, the performing deduplication processing on the physical block of the target memory includes:

extracting a mapped first-level queue entry with the largest weight from the second-level queue entry with the largest the deduplication weight; and performing deduplication processing on the physical block corresponding to the logic address in the mapped first-level queue entry with the largest weight.

In an exemplary embodiment, the calculating a deduplication weight of the initial memory according to the parameter information of the initial memory includes:

calculating the deduplication weight of the initial memory according to the space usage when the parameter information of the initial memory includes the space usage, a first digit in the deduplication weight of the initial memory being a first type value, and other digits being binary values corresponding to the space usage.

In an exemplary embodiment, the calculating a deduplication weight of the initial memory according to the parameter information of the initial memory includes:

calculating the deduplication weight of the initial memory according to the smallest weight in the weight of the at least one physical block when the parameter information of the initial memory includes the weight of the at least one physical block, a first digit in the deduplication weight of the initial memory being a second type value, and other digits being binary values corresponding to the smallest weight.

In an exemplary embodiment, the performing deduplication processing on the physical block of the target memory includes:

if the parameter information of the target memory includes weights of N physical blocks, selecting a physical block with the largest weight from the N physical blocks and performing deduplication processing on the selected physical block, N being a positive integer; and continuing to select a physical block with the largest weight from remaining N−1 physical blocks according to weights of the remaining N−1 physical blocks and performing deduplication processing on the selected physical block.

According to the foregoing manner, it can be ensured that the physical block with the largest weight is preferentially processed during deduplication processing, thereby performing deduplication processing in order on physical blocks in the target memory on which deduplication processing needs to be performed.

In an exemplary embodiment, before the obtaining parameter information of the initial memory, the method further includes:

determining whether a current time point is a preset transmission time point; and obtaining the weight of the at least one physical block as the parameter information of the initial memory if the current time point is the preset transmission time point.

According to the foregoing implementation, it can be ensured that the parameter information of the initial memory is sent to the processor only when a particular condition is met, thereby avoiding that the processor receives unnecessary parameter information of the initial memory and reducing unnecessary data transmission costs.

In an exemplary embodiment, before the obtaining parameter information of the initial memory, the method further includes:

determining whether a space usage of any initial memory is greater than a specified space usage; and obtaining the space usage as the parameter information of the initial memory when the space usage of the initial memory is greater than the specified space usage.

According to the foregoing implementation, it can be ensured that the parameter information of the initial memory is sent to the processor only when a particular condition is met, thereby avoiding that the processor receives unnecessary parameter information of the initial memory and reducing unnecessary data transmission costs.

In an exemplary embodiment, the method further includes:

obtaining the largest variation in space usage variations of the initial memories;

calculating a difference between a first preset space usage and the largest variation; and using the smaller value of the difference and a second preset space usage as the specified space usage, the second preset space usage being less than the first preset space usage.

According to the foregoing implementation, the specified space usage may be dynamically calculated, so that the specified space usage can adaptively calculate the most appropriate parameter according to a real-time storage state and a variation trend of the storage state and configure the most appropriate parameter to a scheduling process of deduplication processing, thereby improving flexibility and robustness of a scheduling method.

According to an aspect of another exemplary embodiment, a storage device is provided, the storage device including a plurality of memories, each memory including at least one physical block, any of the plurality of memories being represented by using an initial memory, and the storage device including:

a first obtaining module, configured to obtain parameter information of the initial memory, the parameter information of the initial memory including at least one of a weight of the at least one physical block in the initial memory and/or a space usage of the initial memory, and the weight of the physical block being used for indicating a next write time point of the physical block;

a first calculation module, configured to calculate a deduplication weight of the initial memory according to the parameter information of the initial memory;

a selection module, configured to select a memory with the largest deduplication weight from the initial memories as a target memory; and a deduplication processing module, configured to perform deduplication processing on the physical block of the target memory.

In an exemplary embodiment, the obtaining module includes:

an obtaining unit, configured to: obtain a first time difference of each physical block in each memory in the initial memories, the first time difference being a time difference that is between adjacent write time points of the physical block and that is estimated according to historical write time points;

a calculation unit, configured to: when a write request for the physical block is detected, calculate a time difference between a first write time point at which the write request is detected and a previous write time point of the physical block and use the time difference as a corrected time difference; and a correction unit, configured to calculate an average value of the first time difference and the corrected time difference and use the average value as a second time difference, the correction unit being further configured to calculate a sum of the first write time point and the second time difference, to obtain a second write time point, and obtain a weight of the physical block according to the second write time point.

In an exemplary embodiment, the storage device further includes:

a first-level queue processing module, configured to: obtain a weight and a physical address of each physical block in the initial memory, form a first-level queue entry, and add the first-level queue entry to a first-level queue of the initial memory; and arrange the first-level queue entries in the first-level queue according to the weights, the first-level queue entries corresponding to the physical blocks in the initial memory, correspondingly, the parameter information of the initial memory including the first-level queue.

In an exemplary embodiment, the selection module is specifically configured to: obtain the deduplication weight and the first-level queue of each initial memory, form a second-level queue entry, and add the second-level queue entry to a second-level queue; arrange the second-level queue entries corresponding to the initial memories according to the deduplication weights; and extract a second-level queue entry with the largest deduplication weight from the second-level queue, and determine a memory corresponding to the second-level queue entry with the largest deduplication weight as the target memory.

In an exemplary embodiment, the first-level queue of the initial memory includes at least one first-level queue entry, and each first-level queue entry includes a physical address of a physical block; and the selection module is further configured to: replace a physical address of each first-level queue entry in the first-level queue with a corresponding logic address according to an address mapping table, to obtain a mapped first-level queue entry, and form a mapped first-level queue by using the mapped first-level queue entry, the address mapping table including a mapping relationship between the physical address and the logic address; and obtain the deduplication weight and the mapped first-level queue of the initial memory, and form the second-level queue entry.

In an exemplary embodiment, the deduplication processing module is specifically configured to: extract a mapped first-level queue entry with the largest weight from the second-level queue entry with the largest the deduplication weight; and perform deduplication processing on the physical block corresponding to the logic address in the mapped first-level queue entry with the largest weight.

In an exemplary embodiment, the first calculation module is specifically configured to: calculate the deduplication weight according to the space usage when the parameter information includes the space usage, a first digit in the deduplication weight being a first type value, and other digits being binary values corresponding to the space usage.

In an exemplary embodiment, the first calculation module is specifically configured to: calculate the deduplication weight of the initial memory according to the smallest weight in the weight of the at least one physical block when the parameter information of the initial memory includes the weight of the at least one physical block, a first digit in the deduplication weight of the initial memory being a second type value, and other digits being binary values corresponding to the smallest weight.

In an exemplary embodiment, the deduplication processing module is specifically configured to: if the parameter information of the target memory includes weights of N physical blocks, select a physical block with the largest weight from the N physical blocks and perform deduplication processing on the selected physical block, N being a positive integer; and continue to select a physical block with the largest weight from remaining N−1 physical blocks according to weights of the remaining N−1 physical blocks and perform deduplication processing on the selected physical block.

In an exemplary embodiment, the storage device further includes:

a first judging module, configured to determine whether a current time point is a preset transmission time point; and a first determining module, configured to perform an operation of using the weight of the at least one physical block as the parameter information of the initial memory when the current time point is the preset transmission time point.

In an exemplary embodiment, the storage device further includes:

a second judging module, configured to determine whether a space usage of any initial memory is greater than a specified space usage, a second determining module being further configured to: perform an operation of using the space usage as the parameter information when the space usage of the initial memory is greater than the specified space usage.

In an exemplary embodiment, the storage device further includes:

a second obtaining module, configured to obtain the largest variation in space usage variations of the initial memories;

a second calculation module, configured to calculate a difference between a first preset space usage and the largest variation; and a third determining module, configured to use the smaller value of the difference and a second preset space usage as the specified space usage, the second preset space usage being less than the first preset space usage.

For beneficial effects of possible implementations in various parts of the storage device, refer to beneficial effects of the corresponding method described above.

According to an aspect of still another exemplary embodiment, a deduplication processing device is provided, the storage device including a plurality of memories, and the device including:

a processor and a memory, the memory being configured to storage program code and transmit the program code to the processor; and the processor being configured to perform the deduplication processing method according to any implementation in the deduplication processing method, described above, according to an instruction in the program code.

For beneficial effects of possible implementations in various parts of the deduplication processing device, refer to beneficial effects of the corresponding method discussed above.

According to an aspect of still another exemplary embodiment, a storage medium is provided, the storage medium being configured to storage program code, the program code being used for performing the deduplication processing method described above.

For beneficial effects of possible implementations in various parts of the storage medium, refer to beneficial effects of the corresponding method discussed above.

According to an aspect of still another exemplary embodiment, a computer program product including an instruction is provided, when being run on a computer, causing the computer to perform the deduplication processing method described above.

For beneficial effects of possible implementations in various parts of the computer program product, refer to beneficial effects of the corresponding method discussed above.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

Figure 1:
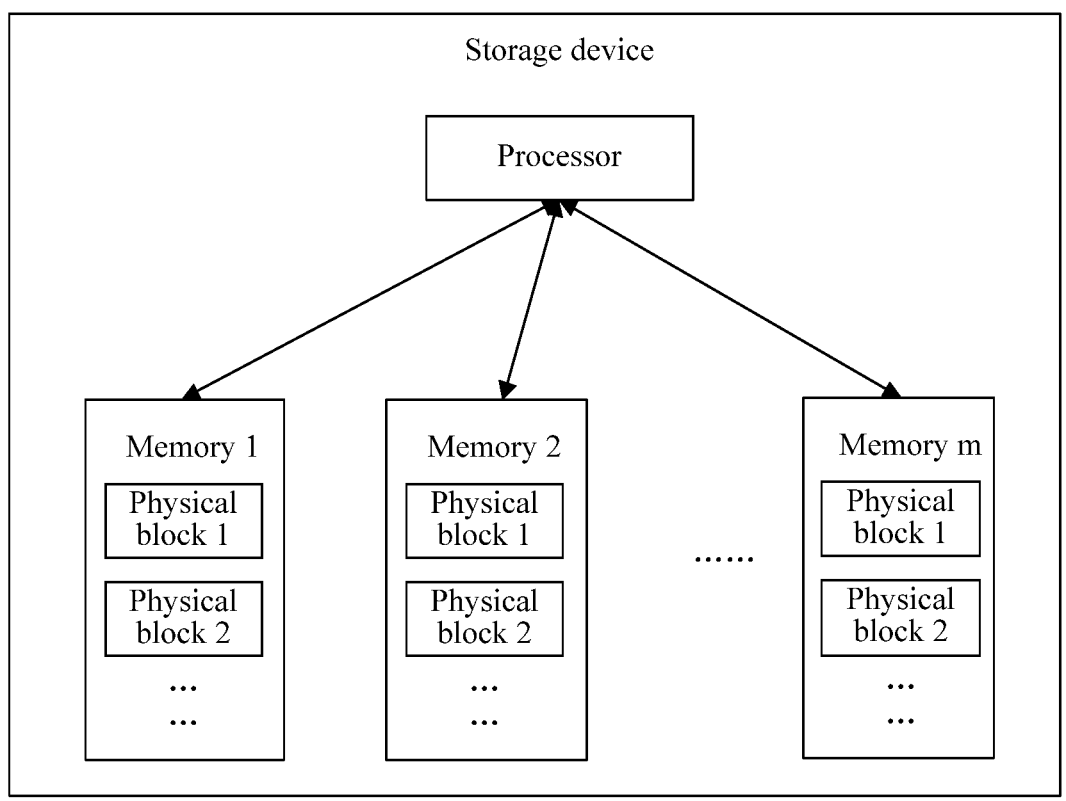
FIG. 1 is a schematic structural diagram of a storage device according to an exemplary embodiment.

The following clearly and completely describes the technical solutions in the exemplary embodiments with reference to the accompanying drawings in the exemplary embodiments. Apparently, the described embodiments are some of the embodiments rather than all of the embodiments. All other embodiments that can be obtained by a person of ordinary skill in the art based on the embodiments in the present invention without creative effects shall fall within the protection scope of the disclosure.

Before embodiments are described in detail, first concepts involved in the embodiments are explained as follows:

1. Storage device: a device for storing data. The storage device includes a processor and a plurality of memories. The processor is configured to control running of the storage device, and each memory is configured to store data.

2. Memory: the memory includes at least one physical block, each physical block includes at least one sector, and the sector is a basic unit of a magnetic disk for reading and writing. In addition, one physical block corresponds to one or more logical blocks, and a physical address of the physical block corresponds to logic addresses of the one or more logical blocks.

The physical address of the physical block may be presented by using an identifier of a first sector in the physical block.

3. Deduplication processing: a processing manner of deleting duplicated data. By means of deduplication processing, the duplicated data in the storage device may be deleted, to save storage space and avoid resource waste.

4. Scheduling of deduplication processing: this refers to a process of selecting from at least one memory a memory on which deduplication processing needs to be performed. After the memory on which deduplication processing needs to be performed is selected, deduplication processing is performed on a physical block in the selected memory. It can be ensured that deduplication processing is performed on a plurality of memories in order by scheduling the plurality of memories in the storage device.

5. Deduplication weight of the memory: this is used for measuring values of priorities according to which deduplication processing is performed on the memories. A larger deduplication weight of a memory indicates that deduplication processing needs to be preferentially performed on the memory.

The deduplication weight of the memory may be determined according to at least one of a space usage of the memory or determined according to a weight of at least one physical block in the memory.

6. Weight of the physical block: this is used for measuring values of priorities according to which deduplication processing is performed on the physical blocks. In the same memory, a larger weight of a physical block indicates that deduplication processing needs to be preferentially performed on the physical block.

The weight of the physical block may be determined according to a next write time point of the physical block. A next write time point having a longer time interval from a preset time of the physical block indicates a larger weight of the physical block.

7. Space usage of the memory: a ratio of a space capacity already occupied by data stored in the memory to a total capacity, and is used for measuring a ratio of space occupied by data in the memory.

8. First-level queue: a memory corresponds to a first-level queue; the first-level queue includes a first-level queue entry corresponding to the physical block in the memory; each first-level queue entry includes a weight and a physical address of the physical block corresponding to the first-level queue entry; a physical block on which deduplication processing needs to be performed in the memory may be scheduled according to the first-level queue of the memory.

9. Second-level queue: a storage device corresponds to a second-level queue; the second-level queue includes a second-level queue entry corresponding to each memory in the storage device; each second-level queue entry includes a deduplication weight and a first-level queue of a memory corresponding to the second-level queue entry; a memory on which deduplication processing needs to be performed in the storage device may be scheduled according to the second-level queue of the storage device.

Solutions in the exemplary embodiments can be applied to any storage device, to perform deduplication processing on duplicated data in the storage device when a polling process of selecting a sample physical block is not involved, thereby saving space of the storage device and avoiding resource waste. The storage device includes a plurality of memories, each memory includes at least one physical block, and data may be stored in at least one physical block. The storage device may further include a processor, and the processor may be configured to control running of the storage device.

In the exemplary embodiments, any memory in the plurality of memories is represented by using the initial memory; the storage device may obtain the parameter information of the initial memory and calculate the deduplication weight of the initial memory according to the parameter information of the initial memory. After deduplication weights of all initial memories are calculated, the storage device may select the memory with the largest deduplication weight from all the initial memories as a target memory, so as to perform deduplication processing on the physical block in the target memory, so as to delete duplicated data from the storage device. The parameter information of the memory includes at least one of a weight of at least one physical block in the memory or a space usage of the memory, and the weight of the physical block is used for indicating a next write time point of the physical block. It can be learned from the above that because the sample physical block does not need to be selected, and deduplication processing does not need to be performed on the sample physical block, to obtain the memory on which deduplication processing needs to be performed, a process of selecting the target memory can be simplified, to improve efficiency of deduplication processing.

In a possible implementation, the parameter information of the initial memory may be obtained by the initial memory and may be sent by the initial memory to the processor, and the processor executes a process of calculating the deduplication weight of the initial memory, selecting the target memory, and performing deduplication processing on the target memory.

Referring to FIG. 1, FIG. 1 is a schematic structural diagram of a storage device according to an exemplary embodiment. The storage device includes a processor and a plurality of memories.

At least one memory in the plurality of memories may obtain parameter information of the at least one memory and send the parameter information to the processor. The processor may receive the parameter information of the at least one memory, separately calculates a deduplication weight of the at least one memory according to the received parameter information of the at least one memory, then selects a memory with the largest deduplication weight according to the calculated deduplication weight of the at least one memory, and performs deduplication processing on a physical block in the selected memory with the largest deduplication weight.

Figure 2:
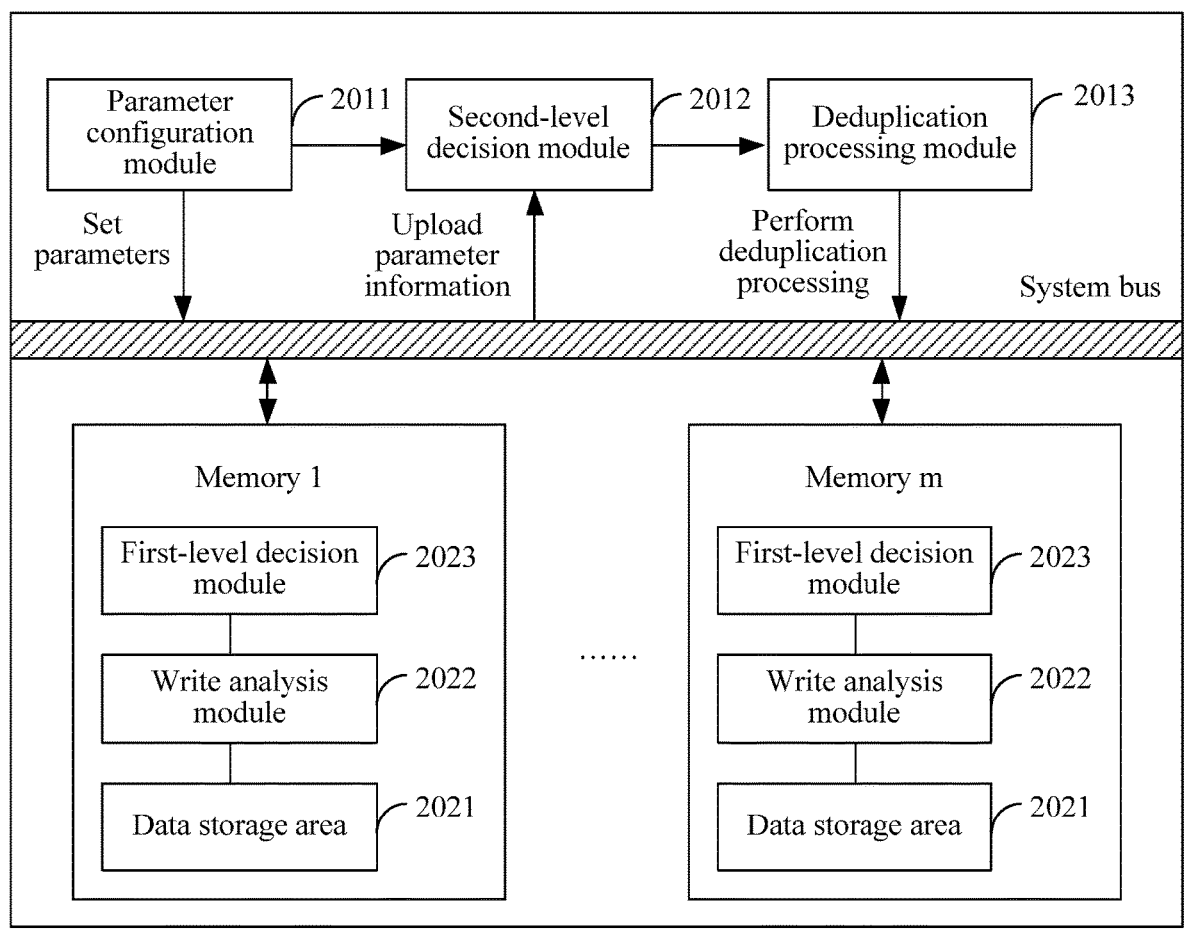
FIG. 2 is a schematic structural diagram of another storage device according to an exemplary embodiment.

Based on the embodiment shown in FIG. 1, FIG. 2 is a schematic structural diagram of a storage device according to an exemplary embodiment. Referring to FIG. 2, the storage device includes a processor 201, a plurality of memories 202, and a system bus. The plurality of memories 202 are connected to the processor 201 by using the system bus.

For the processor 201, for example, the processor 201 may include a parameter configuration module 2011, a second-level decision module 2012, and a deduplication processing module 2013.

The parameter configuration module 2011 may be configured to set a parameter to be used in a deduplication processing scheduling process. The parameter may include, for example, a period at which the memory 202 sends the parameter information to the processor, a specified space usage (or threshold), the largest quantity of first-level queue entries in a first-level queue of the memory 202, the largest quantity of second-level queue entries in a second-level queue of the processor 201, and the like. However, the parameter is not limited to these examples.

The second-level decision module 2012 may be configured to: verdict a sequence of performing deduplication processing on the plurality of memories 202 and maintain the second-level queue. The second-level queue may be stored in a main memory. Each second-level queue entry corresponds to a memory 202 and may include a memory identifier, a deduplication weight, a first-level queue, and the like of the corresponding memory 202. In the second-level queue, a plurality of second-level queue entries may be arranged in ascending order of the deduplication weights. A sequence of the plurality of second-level queue entries may be used for determining a sequence of performing deduplication processing on the plurality of memories.

The deduplication processing module 2013 may be configured to perform an actual deduplication processing operation. In an implementation, the deduplication processing module 2013 may extract a second-level queue entry with the largest deduplication weight from the second-level queue entries, and perform deduplication processing on a physical block in a memory corresponding to the extracted second-level queue entry with the largest deduplication weight.

For each memory 202, the memory 202 may include, for example, a data storage area 2021, a write analysis module 2022, and a first-level decision module 2023.

The data storage area 2021 may be configured to store data.

The write analysis module 2022 may be configured to trace a write operation on each physical block on the data storage area 2021, so as to estimate a next write time point of each physical block according to a write time point of the detected current write operation on each physical block and determine a weight of the physical block according to the estimated next write time point.

The write analysis module 2022 may be triggered by each write operation of each physical block. A whole calculation process may be locally completed at the write analysis module 2022, and the calculated weight of the physical block may be sent to the first-level decision module 2023 as a reference quantity of a first-level decision, and consequently, a result of the first-level decision is affected. The first-level decision module 2023 may schedule deduplication processing of a plurality of physical blocks of the memory 202 in a deduplication processing process according to weights of the physical blocks, so as to avoid as much as possible that a deduplication processing operation is repeatedly performed in the frequently updated physical blocks.

The first-level decision module 2023 may be configured to select a physical block on which deduplication processing is to be performed in the memory 202. For example, the first-level decision module 2023 may select, according to a first-level queue, a physical block on which deduplication processing is to be performed. The first-level queue is a priority queue with a limited length and is stored in a local main memory of the memory 202. Each first-level queue entry may include a physical address, a weight, and the like of a physical block, and a plurality of first-level queue entries are arranged in the first-level queue according to a sequence of weights. Therefore, when deduplication processing is performed on the physical block in the memory 202 according to a sequence of the first-level queue entries in the first-level queue, deduplication processing may be preferentially performed on a physical block with a relatively large weight in the first-level queue.

When a space usage of the memory 202 is greater than a specified space usage, or a current time point is a preset transmission time point, the memory 202 may send the parameter information including the memory identifier, the space usage, and the first-level queue to the second-level decision module 2012, and the second-level decision module 2012 determines a sequence of performing deduplication processing on the plurality of memories.

In another possible implementation, the process of obtaining the parameter information, calculating the deduplication weight, selecting the memory with the largest deduplication weight, and performing deduplication processing may be executed by a specified processing unit, and the specified processing unit is capable of tracing a write operation performed on the memory, to obtain parameter information of any memory, and deduplication processing may also be performed on a physical block in the memory. The specified processing unit may be a unit other than the processor and the plurality of memories, or may be located in the processor, or may be located in each memory. This embodiment does not limit the location of the specified processing unit.

Figure 3:
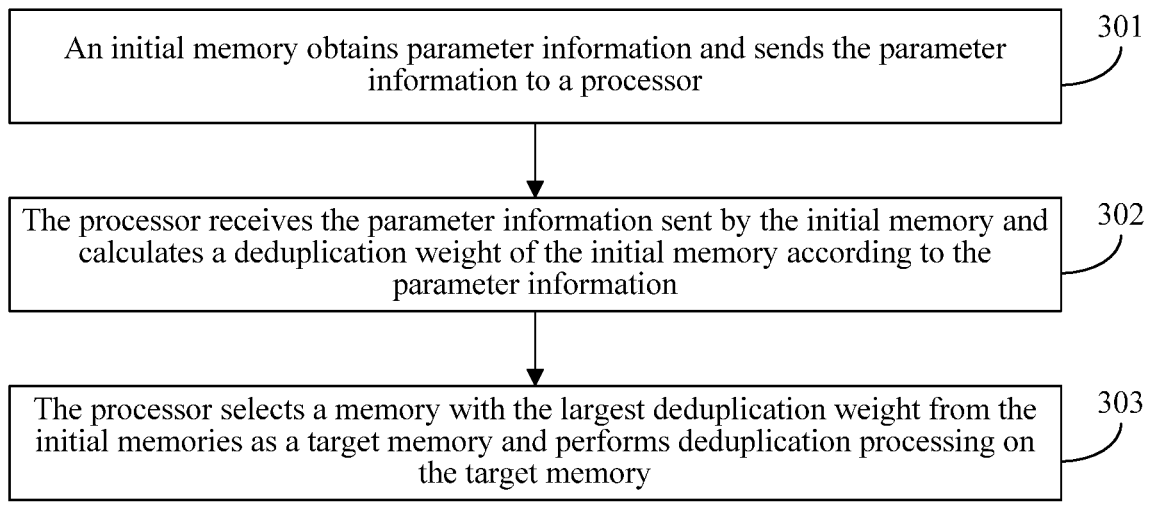
FIG. 3 is a flowchart of a deduplication processing method according to an exemplary embodiment.

FIG. 3 is a flowchart of a deduplication processing method according to an exemplary embodiment. The deduplication processing method is applied to the storage device shown in the foregoing embodiment. The storage device includes a plurality of memories. Each memory includes at least one physical block. Any memory in the plurality of memories may be represented by using an initial memory. Referring to FIG. 3, the method includes:

301: An initial memory obtains parameter information of the initial memory and sends the parameter information of the initial memory to a processor.

The storage device may include the plurality of memories. For each memory, the memory may obtain parameter information of the memory. Therefore, the processor may obtain the parameter information of the memory by sending the parameter information of the memory to the processor by the memory.

The initial memory obtaining the parameter information may be any one or more in the plurality of memories. In an implementation, each memory in the storage device may perform operation 301 according to an embodiment. That is, each memory in the storage device may be used as the initial memory. For each initial memory, the initial memory may obtain parameter information of the initial memory and sends the parameter information of the initial memory to the processor, so that the processor determines, according to the parameter information, a sequence of performing deduplication processing on the plurality of memories. The parameter information of the initial memory includes at least a weight of at least one physical block in the initial memory and/or a space usage of the initial memory.

A quantity of the at least one physical block is not greater than a total quantity of physical blocks of the memory. A weight of each physical block may be used for indicating a next write time point of each physical block. A greater weight of a physical block indicates a longer interval to a next write time point of the physical block and a smaller probability of performing a write operation on the physical block in a process of performing deduplication processing on the physical block. Therefore, deduplication processing needs to be preferentially performed on the physical block, and a smaller weight of a physical block indicates an earlier next write time point of the physical block and a larger probability of performing a write operation on the physical block in a process of performing deduplication processing on the physical block. Therefore, deduplication processing needs to be performed on the physical block later, to avoid performing deduplication processing on a physical block on which writing is being performed.

The space usage may be determined according to a ratio of a capacity of space occupied by data in the initial memory to a total capacity. A greater space usage indicates more data stored in the initial memory, and deduplication processing needs to be preferentially performed to save space. A smaller space usage indicates less data stored in the memory, and deduplication processing does not need to be urgently performed.

In addition, the parameter information of the initial memory may further include an identifier or other parameters of the initial memory. The identifier of the initial memory may be an address, a serial number, or the like of the initial memory. The disclosure is not limited to the example of this embodiment.

The obtained parameter information of the initial memory may be at least a weight of a physical block and/or a space usage of the memory. In this embodiment, processes of obtaining the parameter information of the initial memory may be different based on the different obtained parameter information of the initial memory.

In an example, when the parameter information of the initial memory is a weight of at least one physical block, the process of obtaining the parameter information of the initial memory may include the following operations 3011 to 3014:

3011: For each physical block of the initial memory, the initial memory obtains a first time difference of the physical block.

The first time difference may be a time difference that is between adjacent write time points of the physical block and that is estimated according to historical write time points, that is, a time difference between a first previous write time point and a second previous write time point that follows the first previous write time point of the physical block.

In a process of running the initial storage device, the initial memory may perform a plurality of write operations on the physical block. After performing each write operation, the memory may record a write time point of the write operation. In this way, the first time difference may be obtained through estimation by collecting statistics on the recorded historical write time points. The statistics collection manner may be obtaining an average value from time differences between a plurality of groups of adjacent write time points, or may be a manner similar to a manner provided in operations 3012 to 3014, or certainly may be any another manner. The disclosure is not limited to the example of this embodiment.

3012: When a write request for the physical block is received, calculate a time difference between a first write time point at which the write request is received and a previous write time point of the physical block and use the time difference as a corrected time difference.

In an implementation, the initial memory may receive the write request for the physical block. The write request may carry data to be written into the physical block. Therefore, when performing the write operation, the initial memory may write the data to be written into the physical block and that is carried in the write request into the initial memory.

Considering that the first time difference is only an estimated time difference and may have an error, to obtain a more accurate time difference, the initial memory may monitor the write request for the physical block. When receiving the write request for the physical block each time, the initial memory may obtain the first write time point at which the write request is received and obtain the previous write time point. The previous write time point is a time point at which the write operation is performed the last time and that is prior to the first write time point. The time difference between the first write time point and the previous write time point is calculated and is used as the corrected time difference.

3013: Calculate an average value of the first time difference and the corrected time difference and use the average value as a second time difference.

The corrected time difference may be a time difference that is between adjacent write time points and that is corrected based on the write operation of current time. Therefore, the initial memory may calculate an average value between the originally estimated first time difference and the corrected time difference and use the average value as the second time difference. The second time difference is determined based on the originally estimated first time difference and the new time difference (or the corrected time difference) that is generated based on the currently received write request and is more accurate compared with the first time difference. In other words, the first time difference may be estimated based on adjacent write time points corresponding to the write operations that have been performed in the past, and the corrected time difference is determined based on a time difference between the first write time point at which the write request is currently received and the previous write time point at which the write operation is performed the last time.

3014: Calculate a sum of the first write time point and the second time difference, to obtain a second write time point, and determine a weight of the physical block according to the second write time point.

The second time difference may be considered as a time difference that is after the first write time point and that is between the next write time point and the first write time point. Therefore, the sum of the first write time point and the second time difference is calculated and is used as the second write time point, and the second write time point is an estimated next write time point.

The initial memory may directly use the second write time point as the weight of the physical block or obtain a binary value corresponding to the second write time point and use the binary value as the weight of the physical block. When the binary value corresponding to the second write time point is calculated, a historical time point may be used as reference, and a binary value corresponding to a time difference between the second write time point and the historical time point is used as the weight of the physical block. Certainly, the weight may also be determined according to the second write time point in other manners. The disclosure is not limited to the example of this embodiment.

It should be noted that in addition to the data to be written into the physical block, the write request may carry a logic address corresponding to the physical block into which the data is to be written. When receiving the write request, the initial memory may query for an address mapping table and obtain a physical address corresponding to the logic address, that is, a physical address of the physical block. In this case, the data may be written into the physical block according to the physical address. One physical block corresponds to at least one logical block. Therefore, the physical address of the physical block corresponds to a logic address of the at least one logical block, and the address mapping table includes a mapping relationship between the physical address and the at least one logic address.

Figure 4:
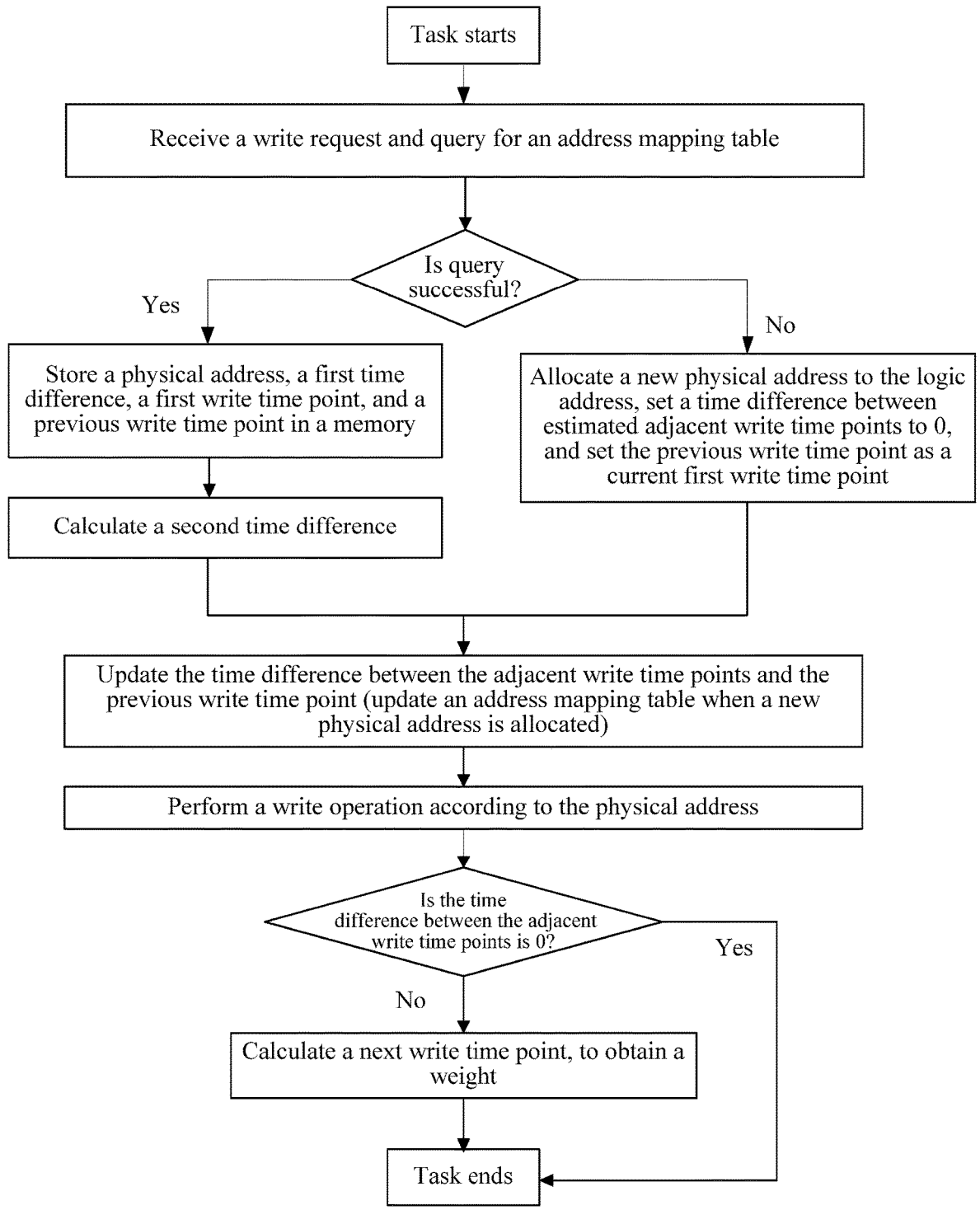
FIG. 4 is a flowchart of calculating a weight of a physical block according to an exemplary embodiment.

It should be noted that referring to FIG. 4, two query results may occur in an actual process of querying the address mapping table:

One query result is: query of the physical address succeeds. That is, the address mapping table is queried when the initial memory receives the write request. Query of the physical address succeeds if the address mapping table includes the physical address corresponding to the logic address. When query of the physical address succeeds, the initial memory may store the found physical address, the first time difference, the first write time point, and the previous write time point of the physical block in a main memory and then calculates the second time difference according to the first write time point, the first time difference, and the previous write time point in the main memory. In this case, the estimated time difference between the adjacent write time points of the physical block may be updated as the second time difference, and the previous write time point of the physical block is updated as the first write time point. Then the write operation is performed according to the physical address, the data to be written into the physical block is written into the physical block, and whether the second time difference is 0 is determined. If the second write time difference is not 0, the initial memory calculates the second write time point according to the first write time point and the second time difference, so as to determine the weight of the physical block according to the second write time point. If the second time difference is 0, the initial memory ends a prediction task for the physical block, no longer predicts the second write time point of the physical block, and no longer obtains the weight of the physical block.

The other query result is: query of the physical address fails. That is, the address mapping table is queried when the initial memory receives the write request. Query of the physical address fails if the address mapping table does not include the physical address corresponding to the logic address.

When query of the physical address fails, the initial memory may allocate a new physical address to the logic address, that is, allocates a new physical block, adds the mapping relationship between the logic address and the physical address to the address mapping table, sets the estimated time difference between the adjacent write time points of the physical block to 0, and sets the previous write time point to the current first write time point. The initial memory performs the write operation according to the physical address and writes the data to be written into the physical block into the physical block.

It should be noted that because the physical block is a newly allocated physical block, and data is written into the physical block for the first time, the time difference between the adjacent write time points is set to 0. In this case, a next write time point of the physical block cannot be predicted, and the weight of the physical block is no longer obtained. When the write request for the physical block is received again in a subsequent process, the next write time point of the physical block may be predicted according to a plurality of write time points, so as to determine the weight of the physical block.

Operation 3011 to operation 3014 may be performed by the write analysis module 2022 shown in FIG. 2.

Optionally, the parameter information of the initial memory may be sent by the initial memory to the processor when meeting a particular condition. Correspondingly, in all memories of the storage device, a memory that meets a particular condition may send the parameter information to the processor, and a memory that does not meet the particular condition may not send the parameter information to the processor.

A possible implementation in this embodiment is: the particular condition may be determined based on a space usage of a memory. For the initial memory, when whether the initial memory meets the particular condition is determined, first the initial memory determines a specified space usage, and then the initial memory determines whether the space usage of the initial memory is greater than the specified space usage. When the space usage of the initial memory is greater than the specified space usage, the initial memory meets the particular condition and may send the parameter information of the initial memory to the processor.

Another possible implementation in this embodiment is: the particular condition may be determined based on a transmission time of the specified parameter information. For the initial memory, the initial memory may determine a plurality of preset transmission time points according to a set period at which the parameter information of the initial memory is sent, and then determines whether the current time point is any preset transmission time point. If the current time point is any preset transmission time point, the initial memory meets the particular condition and may send the parameter information of the initial memory to the processor.

Another possible implementation in this embodiment is: the particular condition may be determined based on both the space usage of the memory and the transmission time of the specified parameter information. For the initial memory, while sending the parameter information of the initial memory according to the preset transmission time point, the initial memory also determines whether the space usage of the initial memory is greater than the specified space usage. Once the space usage is greater than the specified space usage, the initial memory meets the particular condition and may send the parameter information of the initial memory to the processor. That is, a manner of periodically sending the parameter information of the initial memory and a manner of sending the parameter information of the initial memory according to the specified space usage are executed in parallel and do not affect each other. A moment at which the parameter information of the initial memory is sent is not limited in this embodiment.

It may be understood that when the particular conditions that the initial memory meets are different, the parameter information of the initial memory sent by the initial memory to the processor may be different. For example, when the particular condition that the initial memory meets is that the space usage of the initial memory is greater than the specified space usage, the parameter information of the initial memory sent by the initial memory to the processor includes the space usage. When the particular condition that the initial memory meets is that the current time point is any preset transmission time point, the parameter information of the initial memory sent by the initial memory to the processor includes a weight of at least one physical block.

It should be noted that the specified space usage may be preset by the processor and then is delivered to each initial memory, or the processor may dynamically calculates the obtained space usages of the plurality of initial memories, to obtain the specified space usage, and then deliver the specified space usage to each initial memory. The processor may deliver the calculated specified space usage to the initial memory. After preset duration each time, the processor may calculate the specified space usage again and deliver the specified space usage to the initial memory. The initial memory uses the specified space usage as a standard. Once the space usage of the initial memory exceeds the specified space usage, the initial memory sends the parameter information of the initial memory to the processor.

Optionally, a process of dynamically calculating the specified space usage may be performed by the parameter configuration module 2011 shown in FIG. 2.

Optionally, a method of dynamically calculating the specified space usage may include: the initial memory may send the space usage of the initial memory to the processor, and the processor obtains the largest variation in space usage variations of the initial memories, calculates a difference between a first preset space usage and the largest variation, and uses the smaller value of the difference and a second preset space usage as the specified space usage. The second preset space usage is less than the first preset space usage. The space usage variation refers to, when the space usage of the initial memory changes, a difference between the space usage after change and the space usage before change.

For example, the first preset space usage may be 100%, and the second preset space usage may be 95%.

Figure 5:
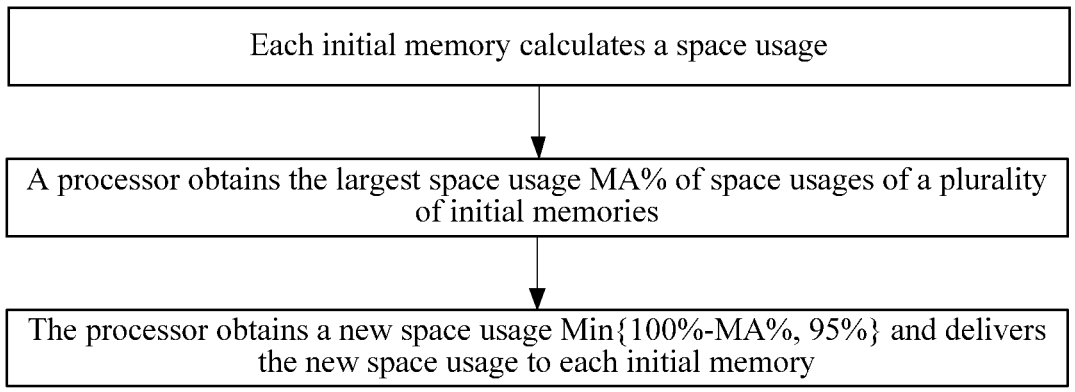
FIG. 5 is a flowchart of calculating a specified space usage according to an exemplary embodiment.

Referring to FIG. 5, assuming that the largest variation is MA %, MA % is a positive integer, the first preset space usage is 100%, and the second preset space usage is 95%, the specified space usage is Min{100%−MA %, 95%}. When MA % is greater than 5%, the specified space usage is 100%−MA %.

When MA % is not greater than 5%, the specified space usage is 95%. For example, when MA %=1%, the specified space usage is 95%. When MA %=10%, the specified space usage is 90%.

302: The processor receives the parameter information of the initial memory sent by the initial memory and calculates a deduplication weight of the initial memory according to the parameter information of the initial memory.

Optionally, for each memory, a method for calculating the deduplication weight of the initial memory may be different based on the different received parameter information of the initial memory. Therefore, operation 302 may include any of operations 3021 to 3023:

3021: Calculate the deduplication weight of the initial memory according to the space usage, a first digit in the deduplication weight of the initial memory being a first type value, and other digits being binary values corresponding to the space usage.

The processor may first determine a quantity of digits of the deduplication weight of the initial memory, when obtaining the space usage of the initial memory, may set the first digit of the deduplication weight of the initial memory as the first type value, obtain binary values corresponding to the space usage, and set the remaining other digits as the binary values corresponding to the space usage.

The deduplication weight of the initial memory may be set as an integer with a symbol by setting the first digit as the first type value. The first type value may be 0 or 1. When the first type value is 0, it may indicate that the deduplication weight of the initial memory is a positive number. When the first type value is 1, it may indicate that the deduplication weight of the initial memory is a negative number.

Optionally, it is determined that the quantity of digits of the deduplication weight of the initial memory is 32. W is used to refer to the deduplication weight of the initial memory, e is used to refer to the first type value, and A is used to refer to a product of the space usage and 100. Therefore, the following formula may be applied to obtain through calculation the deduplication weight of the binary initial memory: $W=e*2^{31}+A*10^6$. Calculation of $e*2^{31}$ may set e as the first digit of the deduplication weight of the initial memory, and calculation of $A*10^6$ may ensure that the remaining other digits are binary values corresponding to the space usage. The calculated deduplication weight of the initial memory and the space usage are in a positive correlation relationship.

3022: Calculate the deduplication weight of the initial memory according to the smallest weight in the weight of the at least one physical block, a first digit in the deduplication weight of the initial memory being a second type value, and other digits being binary values corresponding to the smallest weight.

The processor may first determine the quantity of digits of the deduplication weight of the initial memory. When the weight of the at least one physical block of the initial memory is obtained, the first digit of the deduplication weight of the initial memory is set as the second type value, the smallest weight in the weight of the at least one physical block is obtained, and the remaining other digits are set as the binary values corresponding to the smallest weight.

The deduplication weight of the initial memory may be set as an integer with a symbol by setting the first digit as the second type value. The second type value may be 0 or 1. When the second type value is 0, it indicates that the deduplication weight of the initial memory is a positive number. When the second type value is 1, it indicates that the deduplication weight of the initial memory is a negative number.

Optionally, it is determined that the quantity of digits of the deduplication weight of the initial memory is 32. W is used to refer to the deduplication weight of the initial memory, e is used to refer to the second type value, and w is used to refer to the smallest weight. Therefore, the following formula may be applied to obtain through calculation the deduplication weight of the binary initial memory: $W=e*2^{31}+w$. Calculation of $e*2^{31}$ may set e as the first digit of the deduplication weight of the initial memory, and w may ensure that the remaining other digits are binary values corresponding to the smallest weight. The calculated deduplication weight of the initial memory and the smallest weight are in a positive correlation relationship.

3023: The initial memory determines whether the space usage is greater than the specified space usage. If the space usage is greater than the specified space usage, the deduplication weight of the initial memory is calculated according to the space usage, the first digit in the deduplication weight of the initial memory is the first type value, and other digits are the binary values corresponding to the space usage. If the space usage is not greater than the specified space usage, the deduplication weight of the initial memory is calculated according to the smallest weight in the weight of the at least one physical block, the first digit in the deduplication weight of the initial memory is the second type value, and other digits are the binary values corresponding to the smallest weight.

In this case, the first type value and the second type value are different values of 0 and 1. That is, when the first type value is 0, the second type value is 1, or when the first type value is 1, the second type value is 0, ensuring that the obtained positive and negative deduplication weights of the initial memory are different according to different determining results.

Figure 6:
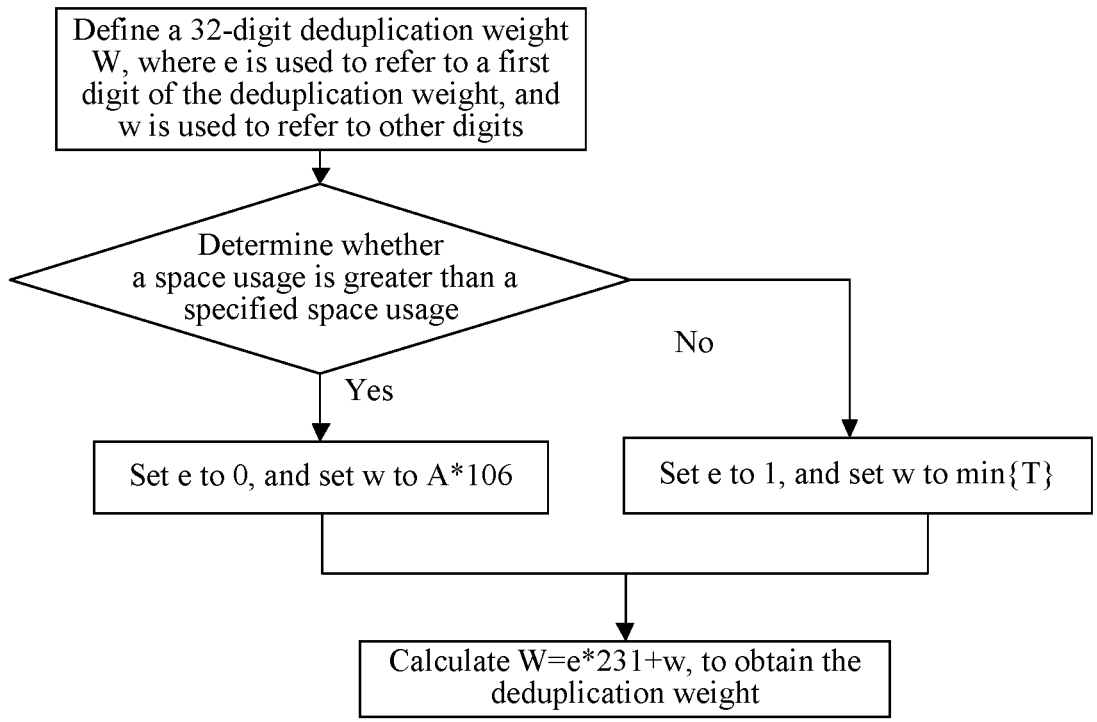
FIG. 6 is a flowchart of calculating a deduplication weight of an initial memory according to an exemplary embodiment.

Referring to FIG. 6, the 32-digit deduplication weight W of the initial memory is defined. e is used to refer to the first digit of the deduplication weight of the initial memory, w is used to refer to other digits, and it is determined whether the space usage is greater than the specified space usage. When the space usage is greater than the specified space usage, e is set to 0, and w is set to $A*10^6$. When the space usage is not greater than the specified space usage, e is set to 1, and w is set to min{T}, that is, the smallest weight of weights T of a plurality of physical blocks. Then, the deduplication weight of the initial memory is obtained through calculation: $W=e*2^{31}+w$.

Considering that an excessively large space usage of the initial memory affects the initial memory in writing data, a situation in which the space usage is greater than the specified space usage may be used as an emergency. For the initial memory, whether the initial memory is in the emergency may be learned according to the positive and negative deduplication weights of the initial memory, so as to preferentially perform deduplication processing on the initial memory in the emergency.

For example, when the first type value is 0, and the second type value is 1, the positive deduplication weight of the initial memory is located prior to the negative deduplication weight of the initial memory. The processor may preferentially perform, according to the deduplication weight of the initial memory, deduplication processing on the initial memory whose deduplication weight is positive, and then perform deduplication processing on the initial memory whose deduplication weight is negative, that is, preferentially perform deduplication processing on the initial memory whose space usage is greater than the specified space usage.

Operation 302 may be performed by the second-level decision module 2012 in the processor.

303: Select a memory with the largest deduplication weight from the initial memories as a target memory and perform deduplication processing on the target memory.

A process of performing deduplication processing on the target memory may be a process of separately performing deduplication processing on a plurality of physical blocks in the target memory. Optionally, using that the parameter information of the target memory includes weights of N physical blocks as an example, the deduplication processing process may include:

The processor selects a physical block with the largest weight from the N physical blocks according to the weights of the N physical blocks in the target memory, performs deduplication processing on the selected physical block, then continues to select a physical block with the largest weight from remaining N−1 physical blocks according to weights of the remaining N−1 physical blocks, and performs deduplication processing on the selected physical block. The rest can be deduced by analogy.

When performing deduplication processing on the physical block, the processor sends a deduplication processing instruction for the physical block to the target memory, to trigger the target memory to perform deduplication processing on the physical block.

The process of selecting the target memory in operation 303 may be executed by the second-level decision module 2012 shown in FIG. 2, and the deduplication processing process may be executed by the deduplication processing module 2013 shown in FIG. 2.

In the method provided in this embodiment, parameter information of an initial memory is obtained, a deduplication weight is calculated according to the parameter information, a memory with the largest deduplication weight is selected from the initial memories as a target memory, and deduplication processing is performed on the target memory. In this way, a process of selecting the target memory does not require selecting a sample physical block and performing deduplication processing on the sample physical block, thereby simplifying a selection process, saving a selection time, and improving deduplication processing efficiency.

In addition, a memory in a storage device obtains the parameter information and sends the parameter information to a processor, and the processor selects the memory according to the received parameter information. A process of selecting the memory does not require polling each memory by the processor, thereby saving resources and improving scheduling efficiency, and only requires transmission of parameter information and does not require data transportation, thereby reducing data transmission costs.

Based on the embodiment shown in FIG. 3, an exemplary embodiment provides a manner of performing scheduling according to queues. Each initial memory may correspond to a first-level queue. Information such as the weight of the physical block in the initial memory is stored in the first-level queue. The processor may have a second-level queue, and information such as the deduplication weight of the initial memory is stored in the second-level queue.

For the initial memory, the initial memory may maintain the first-level queue. When the parameter information of the initial memory is sent to the processor, the parameter information of the initial memory may include the first-level queue and/or the space usage. Correspondingly, a process of maintaining the first-level queue by the initial memory may include the following operations:

1-1: For each physical block in the initial memory, the memory obtains the weight and a physical address of the physical block, forms a first-level queue entry, and adds the first-level queue entry to the first-level queue of the initial memory.

Optionally, each physical block may include at least one sector, each sector corresponds to a unique identifier, and the identifier of the sector may be an address, a serial number, or the like of the sector. The physical address of the physical block is represented by an identifier of a first sector in the physical block. Therefore, deduplication processing may be first performed on the first sector in the physical block when deduplication processing is performed on the physical block.

Figure 7:
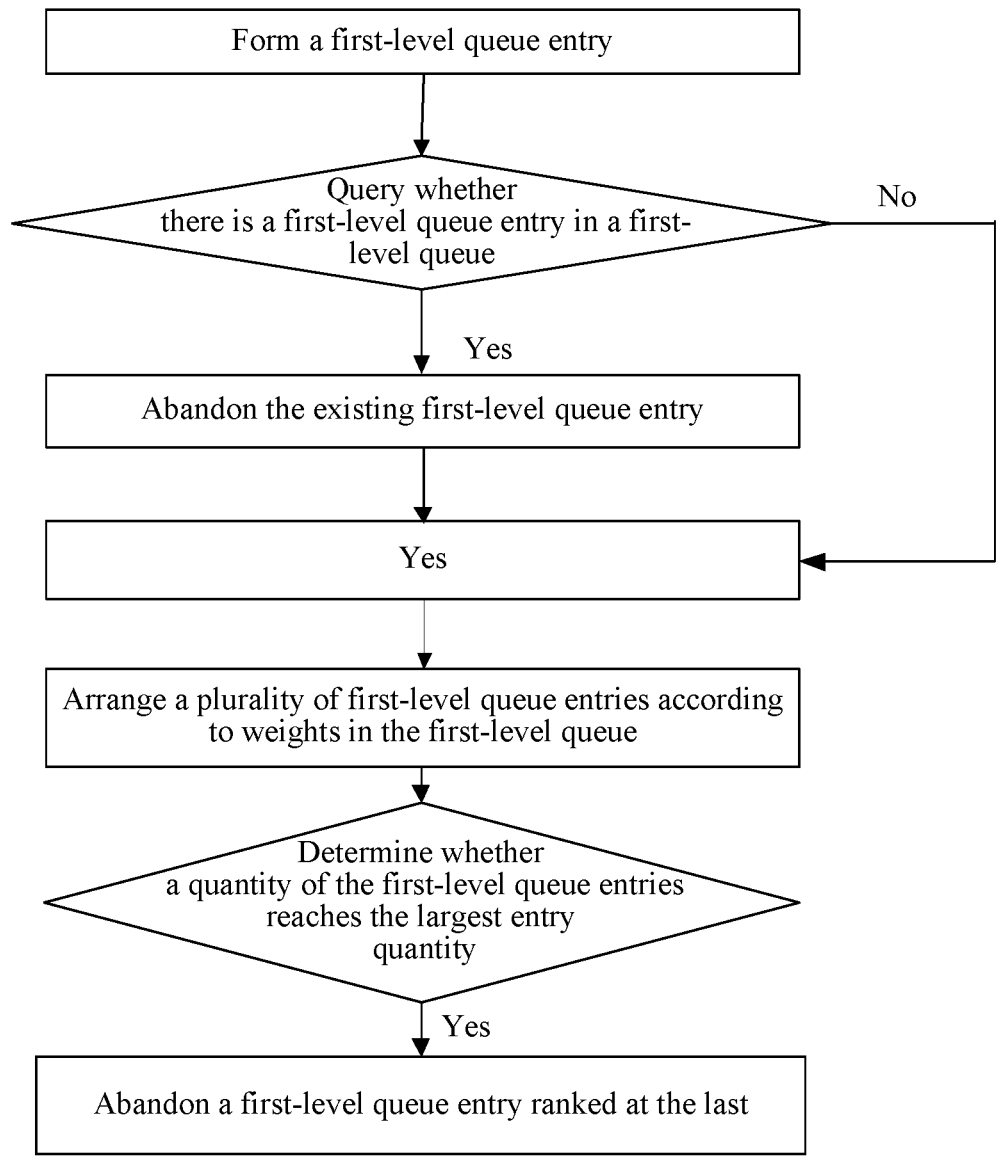
FIG. 7 is a flowchart of maintaining a first-level queue according to an exemplary embodiment.

Referring to FIG. 7, for each physical block, when the initial memory obtains the weight of the physical address of the physical block and forms the first-level queue entry, the initial memory may first query for whether there is a first-level queue entry corresponding to the physical address in the first-level queue. If there is a first-level queue entry corresponding to the physical address in the first-level queue, the first-level queue entry existing in the first-level queue is deleted, and the first-level queue entry newly obtained by the initial memory is added to the first-level queue. If there is no first-level queue entry corresponding to the physical address in the first-level queue, the initial memory directly adds the newly obtained first-level queue entry to the first-level queue.

1-2: The initial memory arranges the plurality of first-level queue entries according to weights in the first-level queue.

The initial memory arranges the plurality of first-level queue entries according to descending order of the weights in the first-level queue. That is, a first-level queue entry ranked at the front of the first-level queue has the largest weight, and a first-level queue entry ranked at the last of the first-level queue has the smallest weight.

When there are two or more first-level queue entries that have the same weight, the first-level queue entries are arranged according to descending order of duration for which the first-level queue entries have been in the queue. A first-level queue entry that has been in the queue for a longer time is ranked at the front, and a first-level queue entry that has been in the queue for a shorter time is ranked in the rear. Duration for which a first-level queue entry has been in a queue is duration for which the first-level queue entry is stored in the first-level queue.

Because a largest entry quantity may be set for the first-level queue, a quantity of the first-level queue entries in the first-level queue cannot exceed the largest entry quantity. To ensure that the quantity of the first-level queue entries in the first-level queue does not exceed the largest entry quantity, and ensure that deduplication processing is preferentially performed on a first-level queue entry with a relatively large weight, referring to FIG. 7, when the quantity of the first-level queue entries in the first-level queue does not reach the largest entry quantity, a new first-level queue entry may continue to be added to the first-level queue. When the quantity of the first-level queue entries in the first-level queue reaches the largest entry quantity, each time a first-level queue entry is added, a first-level queue entry ranked at the last in the first-level queue is abandoned, that is, a first-level queue entry with the smallest weight in the first-level queue is abandoned. In this way, it can be ensured that the quantity of the first-level queue entries does not exceed the largest entry quantity, and abandonment of the first-level queue entry with the smallest weight can ensure that deduplication processing can be subsequently preferentially performed on a first-level queue entry with a relatively large weight.

Operations 1-1 and 1-2 may be performed by the first-level decision module 2023 in the memory.

For the processor, the processor may maintain a second-level queue according to the received parameter information of the initial memory, and a process of maintaining the second-level queue by the processor may include the following operations:

2-1: For each memory in the initial memories, the processor receives parameter information of the initial memory. The parameter information of the initial memory may include information such a first-level queue, an initial memory identifier, and a space usage. Therefore, the processor calculates a deduplication weight of the initial memory according to the parameter information of the initial memory, forms a second-level queue entry by using the deduplication weight of the initial memory and the first-level queue of the initial memory, and adds the second-level queue entry to the second-level queue of the processor.

Optionally, the first-level queue of the initial memory includes a plurality of first-level queue entries, and each first-level queue entry includes a physical address of a physical block in the initial memory. The processor may replace a physical address of each first-level queue entry in the first-level queue with a corresponding logic address according to an address mapping table, to obtain a mapped first-level queue entry, forms a mapped first-level queue by using the mapped first-level queue entry, and forms a second-level queue entry by using the deduplication weight and the mapped first-level queue of the initial memory.

Optionally, the processor may form the second-level queue entry by using the deduplication weight, the mapped first-level queue, and the initial memory identifier of the initial memory. Before adding the second-level queue entry to the second-level queue, the processor may first query for whether there is a second-level queue entry corresponding to the initial memory identifier in the second-level queue.

If there is no second-level queue entry corresponding to the initial memory identifier in the second-level queue, the newly obtained mapped second-level queue entry is directly added to the second-level queue. If there is a second-level queue entry corresponding to the initial memory identifier in the second-level queue, the second-level queue entry existing in the second-level queue and the newly formed second-level queue entry are merged, and the merged second-level queue entry is added to the second-level queue.

2-2: Arrange the second-level queue entries corresponding to the initial memories according to the deduplication weights in the second-level queue.

The processor arranges the second-level queue entries corresponding to the initial memories in the second-level queue according to descending order of the weights. That is, a second-level queue entry ranked at the front of the second-level queue has the largest weight, and a second-level queue entry ranked at the last of the second-level queue has the smallest weight.

When there are two or more second-level queue entries that have the same deduplication weight, the second-level queue entries are arranged according to descending order of duration for which the second-level queue entries have been in the queue. A second-level queue entry that has been in the queue for a longer time is ranked at the front, and a second-level queue entry that has been in the queue for a shorter time is ranked in the rear. Duration for which a second-level queue entry has been in a queue is duration for which the second-level queue entry is stored in the second-level queue.

Because a largest entry quantity may be set for the second-level queue, a quantity of the second-level queue entries in the second-level queue cannot exceed the largest entry quantity. To ensure that the quantity of the second-level queue entries in the second-level queue does not exceed the largest entry quantity, and ensure that deduplication processing is preferentially performed on a second-level queue entry with a relatively large deduplication weight, when the quantity of the second-level queue entries in the second-level queue does not reach the largest entry quantity, a new second-level queue entry may continue to be added to the second-level queue. When the quantity of the second-level queue entries in the second-level queue reaches the largest entry quantity, each time a second-level queue entry is added, a second-level queue entry ranked at the last in the second-level queue is abandoned, that is, a second-level queue entry with the smallest deduplication weight in the second-level queue is abandoned. In this way, it can be ensured that the quantity of the second-level queue entries does not exceed the largest entry quantity, and abandonment of the second-level queue entry with the smallest deduplication weight can ensure that deduplication processing can be subsequently preferentially performed on a second-level queue entry with a relatively large weight.

Figure 8:
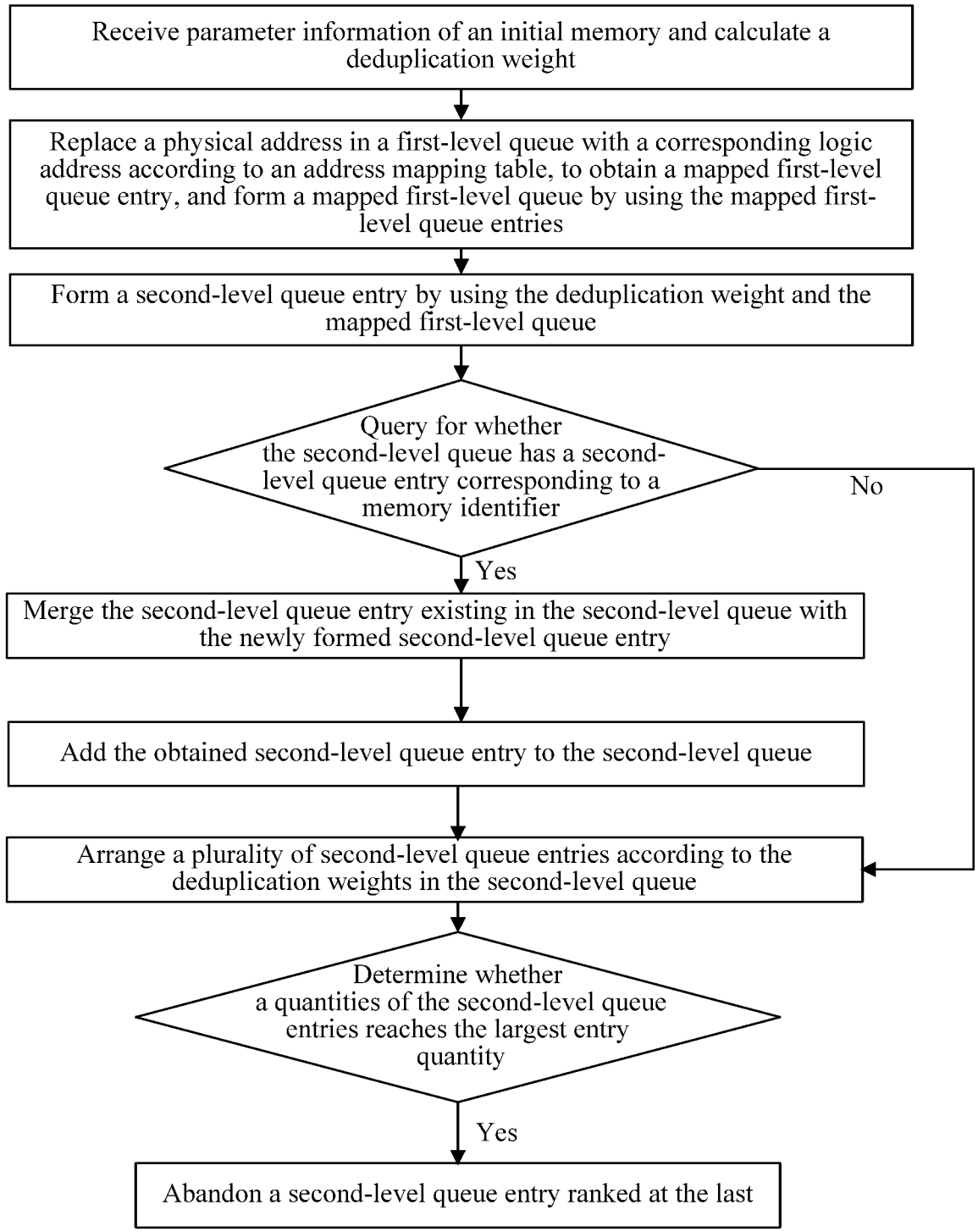
FIG. 8 is a flowchart of maintaining a second-level queue according to an exemplary embodiment.
Figure 9:
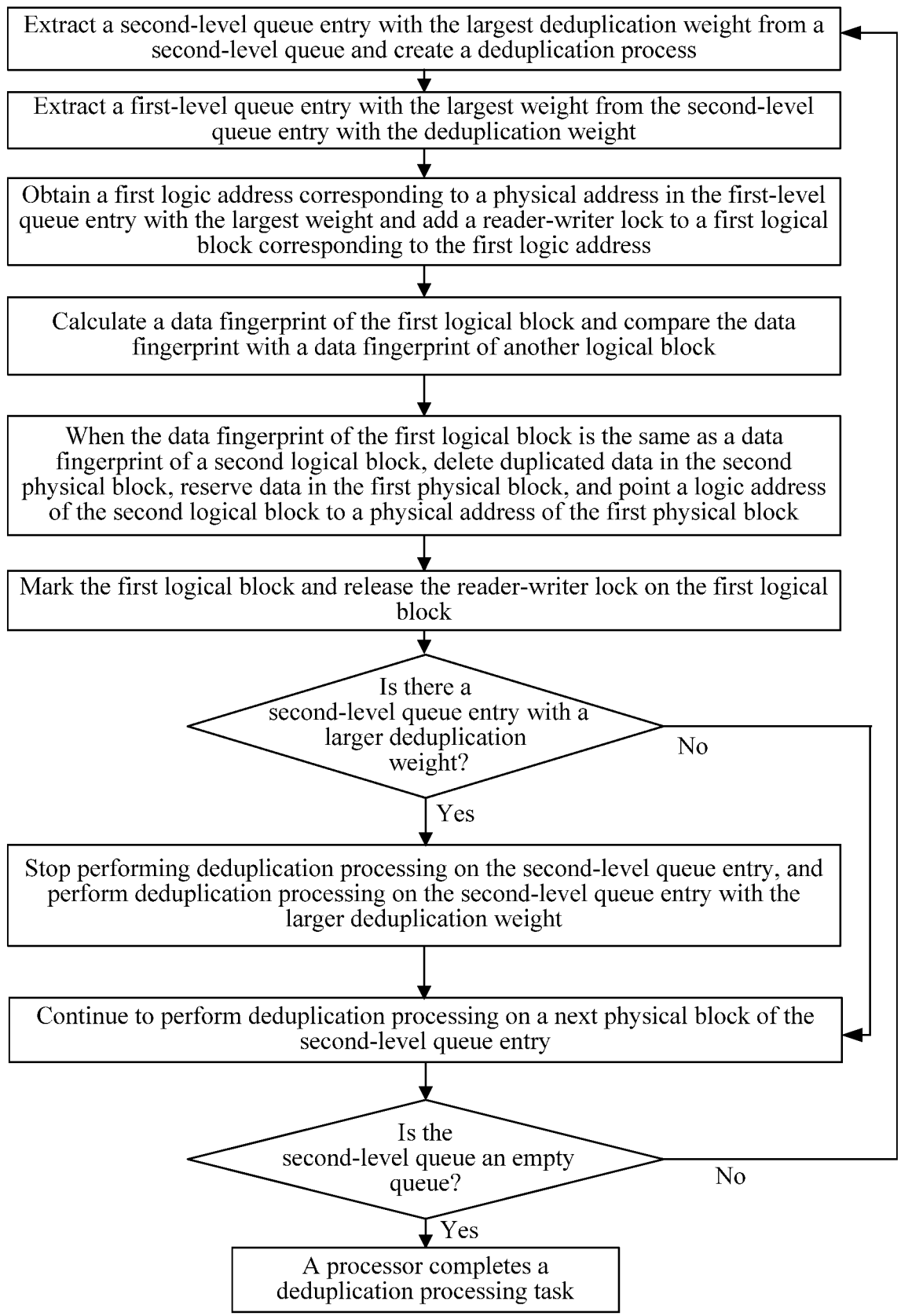
FIG. 9 is a flowchart of deduplication processing according to an exemplary embodiment.

Operations 2-1 and 2-2 may be performed by the second-level decision module 2012 in the processor. Based on operations 2-1 and 2-2, an operation process of the processor may be shown in FIG. 8.

correspondingly, the processor may perform deduplication processing on the initial memory according to the second-level queue. Referring to FIG. 9, the deduplication processing process may specifically include the following operations:

3-1: Extract a second-level queue entry with the largest deduplication weight from the second-level queue.

The processor selects a second-level queue entry with the largest deduplication weight from the second-level queue, that is, a second-level queue entry ranked first in the second-level queue, so as to perform deduplication processing on an initial memory corresponding to the second-level queue entry. After a process of performing deduplication processing on the initial memory is completed, the processor continues to extract a second-level queue entry with the largest deduplication weight from the remaining second-level queue entries in the second-level queue and performs deduplication processing. The rest can be deduced by analogy.

3-2: Perform deduplication processing on an initial memory according to the second-level queue entry with the largest deduplication weight.

The extracted second-level queue entry includes a first-level queue, and the first-level queue may include a plurality of first-level queue entries. Therefore, the first-level queue entry with the largest weight is extracted. The processor may perform deduplication processing on a physical block in the initial memory according to the first-level queue entry with the largest weight. For example, after the first-level queue entry with the largest weight is obtained, the processor obtains a logic address corresponding to a physical address in the extracted first-level queue entry and sends a deduplication processing instruction to the initial memory according to the logic address. Therefore, the initial memory determines the physical address corresponding to the logic address according to the logic address and an address mapping table, and performs deduplication processing on a corresponding physical block according to the physical address.

Certainly, if the extracted second-level queue entry includes a mapped first-level queue, the mapped first-level queue entry with the largest weight is extracted from the mapped first-level queue. The processor directly obtains the logic address in the mapped first-level queue entry, that is, may perform deduplication processing on the physical block corresponding to the logic address according to the logic address.

Using a first physical block and a first logical block corresponding to the first physical block as an example, when obtaining a logic address corresponding to the first logical block, the processor adds a reader-writer lock to the first logical block, to indicate prohibiting performing a write operation on the first logical block; calculates a data fingerprint of the first logical block; and compares the data fingerprint of the first logical block with a data fingerprint of another logical block. When the data fingerprint of the first logical block is the same as a data fingerprint of a second logical block, it indicates that data in the first physical block duplicates with data in a second physical block corresponding to the second logical block thereof. In this case, the data in the second physical block is duplicated data, the duplicated data is deleted, and the data in the first physical block is reserved, and the logic address of the second logical block is made to point to the physical address of the first physical block, that is, a mapping relationship between the logic address of the second physical block and the physical address of the first physical block is added in the address mapping table. The first logical block is marked, to indicate that a deduplication processing process of the first logical block is completed, and the reader-writer lock on the first logical block is released. Subsequently, the first logical block may perform the write operation.

After the deduplication processing process of the physical block corresponding to the first-level queue entry is completed, the processor may continue to extract a first-level queue entry with the largest weight from the remaining first-level queue entries of the first-level queue for deduplication processing until deduplication processing is performed on the plurality of first-level queue entries in the first-level queue. In this case, the deduplication processing process of the initial memory corresponding to the first-level queue is completed.

It should be noted that in actual applications, the processor may generate a deduplication progress, to perform deduplication processing by using the deduplication progress. Usually, the deduplication processing progress cannot be preempted by another second-level queue entry in a process of performing deduplication processing on a second-level queue entry. When and only when a second-level queue entry with a larger deduplication weight in the second-level queue entries is added to the second-level queue, after deduplication processing on a physical block in the second-level queue entry is completed in the deduplication processing progress, the second-level queue entry with the larger the deduplication weight preempts the deduplication processing progress, and the second-level queue entry with the larger the deduplication weight is preferentially processed by using the deduplication processing progress. After processing on the second-level queue entry with the larger the deduplication weight is completed, deduplication processing continues to be performed on a next physical block in the second-level queue entry in the deduplication processing progress.

Operations 3-1 and 3-2 may be performed by the deduplication processing module 2013 in the processor. In addition, a specific operation process of the deduplication processing scheduling process may be shown in FIG. 9.

In the method provided in this embodiment, parameter information of an initial memory is obtained, a deduplication weight is calculated according to the parameter information of the initial memory, a memory with the largest deduplication weight is selected from the initial memories as a target memory, and deduplication processing is performed on the target memory. In this way, a process of selecting the target memory does not require selecting a sample physical block and performing deduplication processing on the sample physical block, thereby simplifying a selection process, saving a selection time, and improving deduplication processing efficiency. In addition, the initial memory in a storage device obtains the parameter information of the initial memory and sends the parameter information of the initial memory to a processor, and the processor selects the target memory according to the received parameter information of the initial memory. Because of an advantage that the initial memory knows better data distribution in the initial memory, the process of selecting the target memory does not require polling each memory in the initial memories by the processor, thereby avoiding costs of useless polling, saving resources, and improving scheduling efficiency, and only requires transmission of the parameter information of the initial memory and does not require data transportation, thereby reducing data transmission costs.

In addition, different granularities may be provided by using two levels of scheduling decision. First-level scheduling within a memory can be refined to a level of a physical block, and second-level scheduling between memories can implement that global deduplication processing of a plurality of memories is orderly performed.

In addition, for a manner of dynamically calculating a parameter such as a specified space usage used in this embodiment, because the parameter such as the specified space usage that is obtained through dynamic calculation is dynamically variable, the most appropriate parameter is obtained through self-adaptive calculation according to a real-time storage state and a trend of the storage state, and the parameter is used in a deduplication processing scheduling process, thereby improving flexibility and robustness of a scheduling method.

In addition, relative to a conventional scheduling method, the deduplication processing scheduling method provided in this embodiment is designed based on a system structure of integrating calculation and storage and is capable of integrating a calculation unit in a memory, so that the calculation unit fast and accurately obtain related parameter information and feeds back the parameter information to the processor, thereby greatly reducing data transmission costs and improving accuracy and effectiveness of a scheduling policy.

In addition, the queues are used in the deduplication processing process in this embodiment for scheduling, a data structure is simple and is easy to implement, and maintenance of the queues are very convenient.

Figure 10:
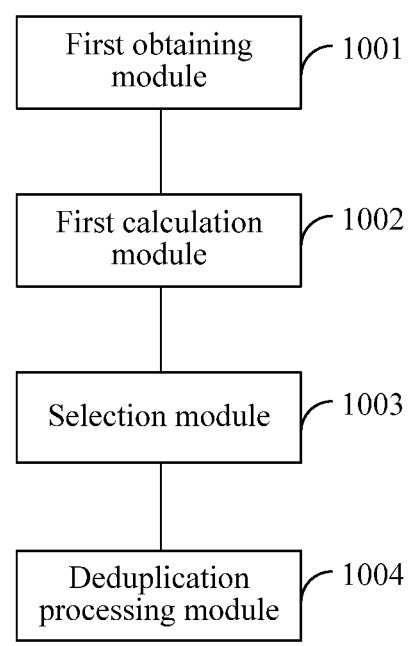
FIG. 10 is a schematic structural diagram of a storage device according to an exemplary embodiment.

FIG. 10 is a schematic structural diagram of a storage device according to an exemplary embodiment. Referring to FIGS. 1 and 10, the storage device includes a plurality of memories, each memory includes at least one physical block, any of the plurality of memories is represented by using an initial memory, and the storage device includes:

a first obtaining module 1001, configured to perform the foregoing operation of obtaining parameter information of the initial memory;

a first calculation module 1002, configured to perform the foregoing operation of calculating a deduplication weight of the initial memory;

a selection module 1003, configured to perform the foregoing operation of selecting a target memory from the initial memories; and a deduplication processing module 1004, configured to the foregoing operation of performing deduplication processing.

Optionally, the first obtaining module 1001, the first calculation module 1002, the selection module 1003, and the deduplication processing module 1004 may be located in a processor of the storage device. The initial memory may be configured to obtain parameter information of the initial memory and send the parameter information of the initial memory to the first obtaining module 1001 of the processor, and the first obtaining module 1001 receives the parameter information of the initial memory sent by the initial memory.

Optionally, the first obtaining module 1001 includes an obtaining unit, a calculation unit, and a correction unit.

The obtaining unit is configured to obtain a first time difference of a physical block; the calculation unit is configured to calculate a corrected time difference; the correction unit is configured to: calculate a second write time point and obtain a weight of the physical block according to the second write time point.

Optionally, the storage device further includes a first-level queue processing module. The first-level queue processing module is configured to: form a first-level queue entry corresponding to the physical block and add the first-level queue entry to a first-level queue and is further configured to arrange the first-level queue entries according to the weights in the first-level queue.

Optionally, the selection module is configured to:

for each initial memory, obtain the deduplication weight and the first-level queue of the initial memory, form a second-level queue entry, and add the second-level queue entry to a second-level queue;

arrange the second-level queue entries corresponding to the initial memories according to the deduplication weights in the second-level queue; and extract a second-level queue entry with the largest deduplication weight from the second-level queue, and determine a memory corresponding to the second-level queue entry with the largest deduplication weight as the target memory.

Optionally, the first-level queue of the initial memory includes at least one first-level queue entry, and each first-level queue entry includes a physical address of a physical block; and the selection module is further configured to:

replace a physical address of each first-level queue entry in the first-level queue with a corresponding logic address according to an address mapping table, to obtain a mapped first-level queue entry, and form a mapped first-level queue by using the mapped first-level queue entry, the address mapping table including a mapping relationship between the physical address and the logic address; and obtain the deduplication weight and the mapped first-level queue of the initial memory, and form the second-level queue entry.

Optionally, the deduplication processing module is configured to:

extract a mapped first-level queue entry with the largest weight from the second-level queue entry with the largest the deduplication weight; and perform deduplication processing on the physical block corresponding to the logic address in the mapped first-level queue entry with the largest weight.

Optionally, the first calculation module is configured to: calculate the deduplication weight of the initial memory according to the space usage when the parameter information of the initial memory includes the space usage, a first digit in the deduplication weight of the initial memory being a first type value, and other digits being binary values corresponding to the space usage.

Optionally, the first calculation module is configured to: calculate the deduplication weight of the initial memory according to the smallest weight in the weight of the at least one physical block when the parameter information of the initial memory includes the weight of the at least one physical block, a first digit in the deduplication weight of the initial memory being a second type value, and other digits being binary values corresponding to the smallest weight.

Optionally, the deduplication processing module is configured to: if the parameter information of the target memory includes weights of N physical blocks, select a physical block with the largest weight from the N physical blocks and perform deduplication processing on the selected physical block, N being a positive integer; and continue to select a physical block with the largest weight from remaining N−1 physical blocks according to weights of the remaining N−1 physical blocks and perform deduplication processing on the selected physical block.

Optionally, the storage device further includes:

a first judging module, configured to determine whether a current time point is a preset transmission time point; and a first determining module, configured to perform an operation of using the weight of the at least one physical block as the parameter information when the current time point is the preset transmission time point.

Optionally, the storage device further includes:

a second judging module, configured to determine whether a space usage of any initial memory is greater than a specified space usage, a second determining module being further configured to: perform an operation of using the space usage as the parameter information when the space usage of the initial memory is greater than the specified space usage.

Optionally, the storage device further includes:

a second obtaining module, configured to obtain the largest variation in space usage variations of the initial memories;

a second calculation module, configured to calculate a difference between a first preset space usage and the largest variation; and a third determining module, configured to use the smaller value of the difference and a second preset space usage as the specified space usage, the second preset space usage being less than the first preset space usage.

It should be noted that when the storage device provided in the foregoing embodiment performs deduplication processing, only divisions of the foregoing functional modules are described by using an example. During actual application, the foregoing functions may be allocated to and completed by different functional modules according to needs, that is, the internal structure of the storage device is divided into different functional modules, to complete all or some of the foregoing described functions. Besides, the storage device provided in the foregoing embodiments and the deduplication processing method embodiments belong to a same idea. For a specific implementation process, refer to the method embodiments. Details are not described herein again. An exemplary embodiment further provides a deduplication processing device, the device including:

a processor and a memory, the memory being configured to storage program code and transmit the program code to the processor; and the processor being configured to perform the following operations according to an instruction in the program code:

obtaining parameter information of the initial memory, the parameter information including at least a weight of the at least one physical block in the initial memory and/or a space usage of the initial memory, and the weight of the physical block being used for indicating a next write time point of the physical block;

calculating a deduplication weight of the initial memory according to the parameter information of the initial memory; and selecting a memory with the largest deduplication weight from the initial memories as a target memory and performing deduplication processing on the physical block of the target memory.

An exemplary embodiment further provides a storage medium, configured to store program code, the program code being used for performing any implementation in the deduplication processing method in the foregoing embodiments.

An exemplary embodiment further provides a computer program product including an instruction, when being run on a computer, causing the computer to perform any implementation in the deduplication processing method in the foregoing embodiments.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component such as a processor or a circuit, and/or a software component that is executed by a hardware component such as a processor.

A person of ordinary skill in the art may understand that all or some of the operations of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments, but are not intended to limit the disclosure. Any modification, equivalent replacement, or improvement made within the spirit and principle of the disclosure shall fall within the protection scope of the disclosure.

What is claimed is:

1. A deduplication processing method, comprising:
obtaining, by at least one processor of a storage device, parameter information of an initial memory representing any one of a plurality of memories in the storage device, each memory comprising at least one physical block, the parameter information comprising at least one of a weight of the at least one physical block in the initial memory or a space usage of the initial memory, and the weight of the at least one physical block corresponding to a next write time point of the at least one physical block;
obtaining, by the at least one processor of the storage device, a deduplication weight of the initial memory according to the parameter information of the initial memory; and
selecting, by the at least one processor of the storage device, a target memory having a largest deduplication weight from initial memories and performing deduplication processing on the at least one physical block of the target memory.

2. The method according to claim 1, wherein the obtaining the parameter information comprises:
for each physical block in the initial memory, obtaining a first time difference of a physical block, the first time difference being a time difference that is between adjacent write time points of the physical block and that is estimated according to historical write time points;
when a write request for the physical block is detected, obtaining, as a corrected time difference, a time difference between a first write time point at which the write request is detected and a previous write time point of the physical block;
obtaining, as a second time difference, an average value of the first time difference and the corrected time difference; and
obtaining a second write time point based on a sum of the first write time point and the second time difference, and obtaining a weight of the physical block according to the second write time point.

3. The method according to claim 1, further comprising:
for each physical block in the initial memory, forming, by the at least one processor of the storage device, a first-level queue entry including a weight and a physical address of a physical block, and adding the first-level queue entry to a first-level queue of the initial memory, the first-level queue being included in the parameter information; and arranging, by the at least one processor of the storage device, first-level queue entries corresponding to physical blocks in the initial memory according to weights in the first-level queue.

4. The method according to claim 3, wherein the selecting comprises:

for each initial memory, forming a second-level queue entry including the deduplication weight and the first-level queue of the initial memory, and adding the second-level queue entry to a second-level queue;

arranging second-level queue entries corresponding to the initial memories according to deduplication weights in the second-level queue; and extracting a second-level queue entry having the largest deduplication weight from the second-level queue, and determining the target memory corresponding to the second-level queue entry having the largest deduplication weight.

5. The method according to claim 4, wherein the forming the second-level queue entry comprises:

replacing a physical address of each first-level queue entry in the first-level queue with a corresponding logic address according to an address mapping table, to obtain a mapped first-level queue entry, and forming a mapped first-level queue by using the mapped first-level queue entry, the address mapping table comprising a mapping relationship between the physical address and the corresponding logic address; and forming the second-level queue entry based on the deduplication weight and the mapped first-level queue of the initial memory.

6. The method according to claim 5, wherein the performing comprises:

extracting a mapped first-level queue entry having a largest weight from the second-level queue entry having the largest deduplication weight; and performing the deduplication processing on the at least one physical block corresponding to the logic address in the mapped first-level queue entry having the largest weight.

7. The method according to claim 1, wherein the parameter information comprises the space usage, and the obtaining the deduplication weight comprises:

obtaining the deduplication weight of the initial memory according to the space usage, the deduplication weight comprising binary values corresponding to the space usage.

8. The method according to claim 1, wherein the parameter information comprises the weight of the at least one physical block, and the obtaining the deduplication weight comprises:

obtaining the deduplication weight of the initial memory according to a smallest weight in the weight of the at least one physical block, the deduplication weight comprising binary values corresponding to the smallest weight.

9. The method according to claim 1, wherein the parameter information of the target memory comprises weights of N physical blocks (N being a positive integer), and the performing comprises:

selecting a first physical block having a largest weight from the N physical blocks and performing the deduplication processing on the first physical block; and subsequently selecting a second physical block having the largest weight from remaining N−1 physical blocks and performing the deduplication processing on the second physical block.

10. The method according to claim 1, further comprising:

determining, by the at least one processor of the storage device, whether a current time point is a preset transmission time point; and determining, by the at least one processor of the storage device, the parameter information based on the weight of the at least one physical block when the current time point is the preset transmission time point.

11. The method according to claim 1, further comprising:

determining, by the at least one processor of the storage device, whether the space usage of any initial memory is greater than a threshold; and determining, by the at least one processor of the storage device, the parameter information based on the space usage when the space usage of the initial memory is greater than the threshold.

12. The method according to claim 11, further comprising:

obtaining, by the at least one processor of the storage device, a largest variation in the space usage of the initial memories;

obtaining, by the at least one processor of the storage device, a difference between a first preset space usage and the largest variation; and determining, by the at least one processor of the storage device, the threshold based on a smaller value between the difference and a second preset space usage, the second preset space usage being less than the first preset space usage.

13. A storage device, comprising a plurality of memories, each memory comprising at least one physical block, the storage device comprising:

at least one memory configured to store program code; and at least one processor configured to access the at least one memory and operate according to the program code, the program code comprising:

first obtaining code configured to cause the at least one processor to obtain parameter information of an initial memory representing any one of the plurality of memories, the parameter information comprising at least one of a weight of the at least one physical block in the initial memory or a space usage of the initial memory, and the weight of the at least one physical block corresponding to a next write time point of the at least one physical block;

second obtaining code configured to cause the at least one processor to obtain a deduplication weight of the initial memory according to the parameter information of the initial memory; and selection code configured to cause the at least one processor to select a target memory having a largest deduplication weight from initial memories; and deduplication processing code configured to cause the at least one processor to perform deduplication processing on the at least one physical block of the target memory.

14. The storage device according to claim 13, wherein the first obtaining code causes the at least one processor to:

for each physical block in the initial memory, obtain a first time difference of the physical block, the first time difference being a time difference that is between adjacent write time points of the physical block and that is estimated according to historical write time points;

when a write request for the physical block is detected, obtain, as a corrected time difference, a time difference between a first write time point at which the write request is detected and a previous write time point of the physical block;

obtain, as a second time difference, an average value of the first time difference and the corrected time difference; and obtain a second write time point based on a sum of the first write time point and the second time difference and obtain a weight of the physical block according to the second write time point.

15. The storage device according to claim 13, wherein the program code further comprises:

first-level queue processing code configured to cause the at least one processor to:

for each physical block in the initial memory, form a first-level queue entry including a weight and a physical address of a physical block, and add the first-level queue entry to a first-level queue of the initial memory, the first-level queue being included in the parameter information; and arrange first-level queue entries corresponding to physical blocks in the initial memory according to weights in the first-level queue.

16. The storage device according to claim 13, wherein the selection code causes the at least one processor to:

for each initial memory, form a second-level queue entry including the deduplication weight and the first-level queue of the initial memory, and add the second-level queue entry to a second-level queue;

arrange second-level queue entries corresponding to the initial memories according to deduplication weights in the second-level queue; and extract a second-level queue entry having the largest deduplication weight from the second-level queue, and determine the target memory corresponding to the second-level queue entry having the largest deduplication weight.

17. The storage device according to claim 16, wherein the selection code causes the at least one processor to:

replace a physical address of each first-level queue entry in the first-level queue with a corresponding logic address according to an address mapping table, to obtain a mapped first-level queue entry, and form a mapped first-level queue by using the mapped first-level queue entry, the address mapping table comprising a mapping relationship between the physical address and the corresponding logic address; and form the second-level queue entry based on the deduplication weight and the mapped first-level queue of the initial memory.

18. The storage device according to claim 17, wherein the deduplication processing code causes the at least one processor to:

extract a mapped first-level queue entry having a largest weight from the second-level queue entry having the largest deduplication weight; and perform the deduplication processing on the at least one physical block corresponding to the logic address in the mapped first-level queue entry having the largest weight.

19. The storage device according to claim 13, wherein the second obtaining code causes the at least one processor to obtain the deduplication weight comprising binary values corresponding to the space usage when the parameter information comprises the space usage, and to obtain the deduplication weight comprising binary values corresponding to a smallest weight in the weight of the at least one physical block when the parameter information comprises the weight of the at least one physical block.

20. A non-transitory computer-readable storage medium, storing program code, which, when executed by one or more processors, causes the one or more processors to perform:

obtaining, by at least one processor of a storage device, parameter information of an initial memory representing any one of a plurality of memories in the storage device, each memory comprising at least one physical block, the parameter information comprising at least one of a weight of the at least one physical block in the initial memory or a space usage of the initial memory, and the weight of the at least one physical block corresponding to a next write time point of the at least one physical block;

obtaining, by the at least one processor of the storage device, a deduplication weight of the initial memory according to the parameter information of the initial memory; and selecting, by the at least one processor of the storage device, a target memory having a largest deduplication weight from initial memories and performing deduplication processing on the at least one physical block of the target memory.

* * * * *